(12) United States Patent
McNew

(10) Patent No.: US 9,956,910 B2
(45) Date of Patent: May 1, 2018

(54) AUDIBLE NOTIFICATION SYSTEMS AND METHODS FOR AUTONOMOUS VEHICLES

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days. days.

(21) Appl. No.: 15/212,557

(22) Filed: Jul. 18, 2016

(65) Prior Publication Data

US 2018/0015878 A1    Jan. 18, 2018

(51) Int. Cl.
B60Q 1/00    (2006.01)
B60Q 9/00    (2006.01)
G05D 1/00    (2006.01)

(52) U.S. Cl.
CPC ............ *B60Q 9/00* (2013.01); *G05D 1/0088* (2013.01)

(58) Field of Classification Search
CPC combination set(s) only.
See application file for complete search history.

(56) References Cited

U.S. PATENT DOCUMENTS

| 5,557,680 | A * | 9/1996 | Janes | H04R 5/02 381/1 |
| 6,845,338 | B1 * | 1/2005 | Willins | G01S 3/803 340/988 |
| 7,649,444 | B1 * | 1/2010 | Fear | B60Q 5/00 340/384.1 |
| 7,856,106 | B2 * | 12/2010 | Bruno | H04S 3/00 381/1 |
| 7,916,039 | B2 * | 3/2011 | Hess | B60W 50/14 340/384.7 |
| 8,824,709 | B2 * | 9/2014 | Li | H04S 3/002 381/300 |
| 8,825,264 | B2 | 9/2014 | Montemerlo et al. | |
| 8,907,814 | B2 | 12/2014 | Chen | |
| 9,159,236 | B2 | 10/2015 | Lord et al. | |
| 9,467,791 | B2 * | 10/2016 | Robinson | H04S 3/008 |
| 9,507,346 | B1 * | 11/2016 | Levinson | G05D 1/0214 |
| 2007/0269062 | A1 * | 11/2007 | Rodigast | H04R 1/403 381/310 |
| 2008/0267413 | A1 * | 10/2008 | Faller | H04S 3/002 381/1 |
| 2009/0125584 | A1 * | 5/2009 | Agrawala | H04W 4/02 709/203 |
| 2013/0003998 | A1 * | 1/2013 | Kirkeby | G05B 23/0235 381/300 |

(Continued)

FOREIGN PATENT DOCUMENTS

JP    05-085288    4/1993

*Primary Examiner* — Quang D Pham
(74) *Attorney, Agent, or Firm* — Dinsmore & Shohl LLP

(57) ABSTRACT

An object detection and notification system includes an object detection system including logic that detects presence of a target object within a sensing range of a sensor and determines a direction of the target object relative to the autonomous vehicle. A notification system includes logic that provides a sound cue using a speaker to an occupant of the autonomous vehicle that is indicative of location of the target object relative to the autonomous vehicle.

10 Claims, 8 Drawing Sheets

(56) References Cited

U.S. PATENT DOCUMENTS

| | | | |
|---|---|---|---|
| 2013/0060401 A1 | 3/2013 | Hahne | |
| 2013/0268280 A1* | 10/2013 | Del Galdo | G10L 19/02 704/500 |
| 2014/0133683 A1* | 5/2014 | Robinson | H04S 3/008 381/303 |
| 2014/0355793 A1* | 12/2014 | Dublin | H04S 7/303 381/302 |
| 2015/0041245 A1* | 2/2015 | Smith | G10K 11/28 181/202 |
| 2015/0117772 A1* | 4/2015 | Yang | G06F 17/3079 382/165 |
| 2015/0189453 A1* | 7/2015 | Udesen | H04R 25/554 381/315 |
| 2015/0269925 A1* | 9/2015 | Kanaya | B60Q 5/008 381/71.4 |
| 2015/0336578 A1 | 11/2015 | Lord et al. | |
| 2015/0379397 A1* | 12/2015 | van der Made | G06N 3/049 706/20 |
| 2015/0382127 A1* | 12/2015 | Sun | H04S 7/30 381/17 |
| 2016/0066118 A1* | 3/2016 | Oh | G10L 19/008 381/303 |
| 2016/0162985 A1* | 6/2016 | Alhakim | G06Q 30/0645 705/307 |
| 2016/0205473 A1* | 7/2016 | Rodigast | H04R 1/403 381/303 |
| 2016/0217689 A1* | 7/2016 | Young | G08G 1/0965 |
| 2016/0257248 A1* | 9/2016 | Lisseman | B60K 37/06 |
| 2017/0154533 A1* | 6/2017 | Illy | G08G 1/166 |

\* cited by examiner

AUDIBLE NOTIFICATION SYSTEMS AND METHODS FOR AUTONOMOUS VEHICLES

TECHNICAL FIELD

The present specification generally relates to autonomous vehicles and methods for monitoring objects and, more specifically, to audible notification systems and methods for autonomous vehicles.

BACKGROUND

Vehicles exist that are capable of driving either completely autonomously or partially autonomously. Autonomous vehicles often utilize preceding vehicle speed for path planning, using LiDAR, as an example. During autonomous or highly automated driving the driver may only monitor the roadway and/or visual display of the vehicle intermittently.

Accordingly, a need exists for methods to communicate in a non-visual manner the surrounding conditions to a vehicle occupant. In particular, the conveyance of this information can allow the driver to regain situational awareness by providing directional cues to let the driver know in which direction to look when looking to the vehicle exterior.

SUMMARY

In one embodiment, for an autonomous vehicle, an object detection and notification system includes an object detection system including logic that detects presence of a target object within a sensing range of a sensor and determines a direction of the target object relative to the autonomous vehicle. A notification system includes logic that provides a sound cue using a speaker to an occupant of the autonomous vehicle that is indicative of location of the target object relative to the autonomous vehicle.

In another embodiment, an autonomous vehicle includes one or more processors and one or more memory modules communicatively coupled to the one or more processors. A speaker is connected to the one or more processors. One or more sensors are communicatively coupled to the one or more processors. Machine readable instructions are stored in the one or more memory modules that cause the one or more processors to provide a sound cue using the speaker to an occupant of the autonomous vehicle that is indicative of location of a target object relative to the autonomous vehicle.

In yet another embodiment, a method of providing information to an occupant of an autonomous vehicle about a target object is provided. The method includes detecting the target object using one or more sensors that provide input to one or more processors. A location of the target object is determined relative to the autonomous vehicle using the input and the one or more processors. The one or more processors provide a sound cue using a speaker to the occupant of the autonomous vehicle that is indicative of location of the target object relative to the autonomous vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to autonomous vehicles and methods for monitoring target objects and providing audible notifications to occupants of the autonomous vehicle in a spatio-temporal fashion. The autonomous vehicles include an object detection and notification system including one or more sensors that are used to detect target objects, such as vehicles, in the surrounding environment. The object detection and notification system includes a sound notification system within the autonomous vehicle that provides patterned sound cues to quickly localize the occupant's awareness to the target object when preselected conditions are met. The sound cues are "spatio-temporal" in that their patterning occurs in both space and time, thereby increasing information that can be conveyed to the occupant.

Figure 1:
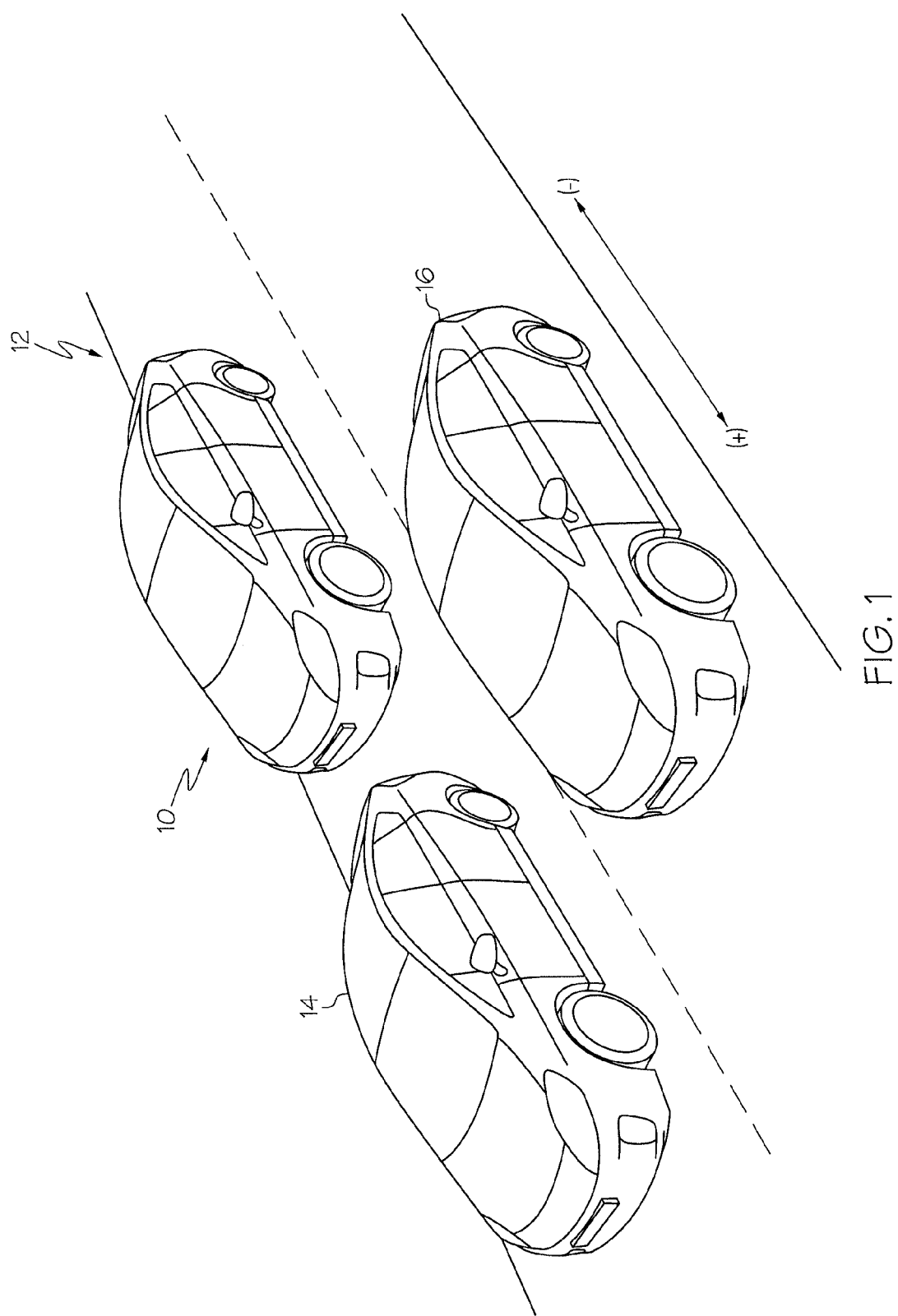
FIG. 1 depicts several vehicles including an autonomous vehicle on a road according to one or more embodiments shown and described herein.

Referring to FIG. 1, an autonomous vehicle 10 is depicted on a roadway 12. When referring to autonomous or partially autonomous vehicles, it is meant to refer to vehicles having at least one drive mode wherein a human operator is not necessary to guide the vehicle. In some embodiments, aspects of the present disclosure may apply to various vehicle types, such as planes, trucks, boats, etc. with autonomous, partially autonomous driving systems or not. Target objects 14 and 16 are also shown on the roadway 12 within the vicinity of the autonomous vehicle 10. Though the target objects 14 and 16 are shown as other vehicles, it is noted that the target objects 14 and 16 could be other objects including, but not limited to, other vehicles, cyclists, pedestrians, buildings, animals, or other obstacles, such as bodies of water, trees, etc. Further, though the target objects 14, 16 are depicted as going in the same general direction as the autonomous vehicle 10, it is noted, that the contents of the present application are applicable to objects traveling or otherwise changing distance relative to the autonomous vehicle 10 in any direction including stationary objects.

Figure 2:
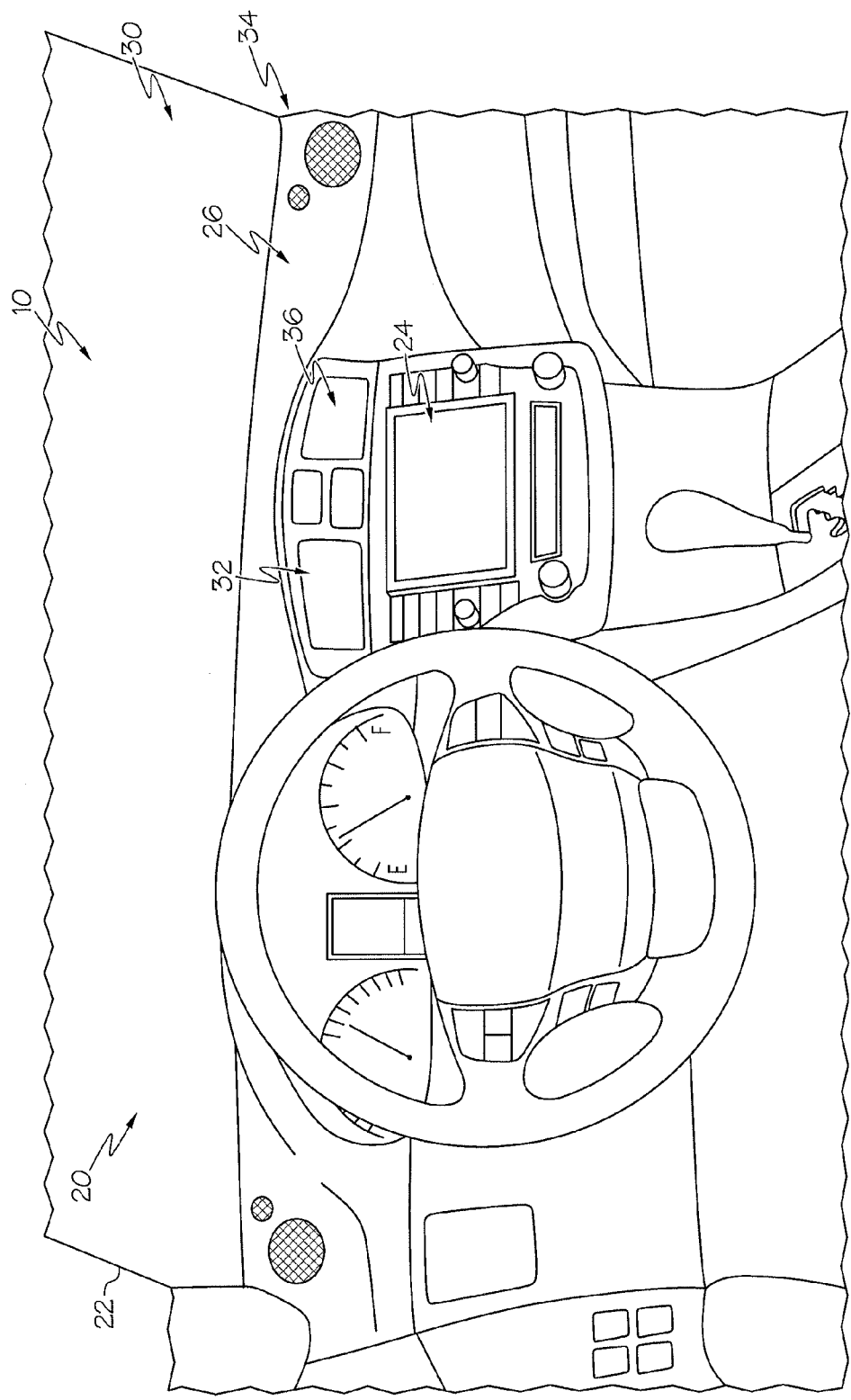
FIG. 2 depicts an interior of the autonomous vehicle of FIG. 1 according to one or more embodiments shown and described herein.

Referring now to FIG. 2, the autonomous vehicle 10 has an interior 20, a windshield 22, and a display 24. Though the display 24 is situated within a dashboard 26 of the autonomous vehicle 10, it is noted that the display 24 may be at least one of a heads-up display, an instrument cluster display, a navigation display, and a display of a mobile device. The autonomous vehicle 10 further includes an object detection and notification system 30. The object detection and notification system 30 may include a sound notification system 32 that includes one or more speakers 34. The speakers 34 may be integrated with a head unit 36 of the autonomous vehicle 10, and/or they may be part of a separate sound notification system (e.g., provided separately from the autonomous vehicle 10) and connected therewith.

Aspects described herein may utilize the object detection and notification system 30 to detect presence of a target object and, under predetermined conditions, provide patterned sound cues to localize the occupant's awareness to the target object. The sound cues may be patterned based on one or more of location of the target object, speed of the target object, location of occupants in the autonomous vehicle 10, information of an occupant's viewing angle, etc. In some embodiments, the driver's viewing angle, for example, can be used to determine both where (e.g., which direction) and how (e.g., the intensity and type of the sound output) to output sound using a directional sound notification system, such as a 3-D and/or surround sound notification system. As used herein, a directional sound notification system is meant to encompass any sound notification system that can provide spatio-temporal patterning of localized sound to the vehicle occupant across multiple directions (e.g., front, back, left, right, above, below and combinations thereof). The sound can be perceived by the vehicle occupant as being located at a particular location and, in some embodiments, moving through space to a different location.

Figure 3:
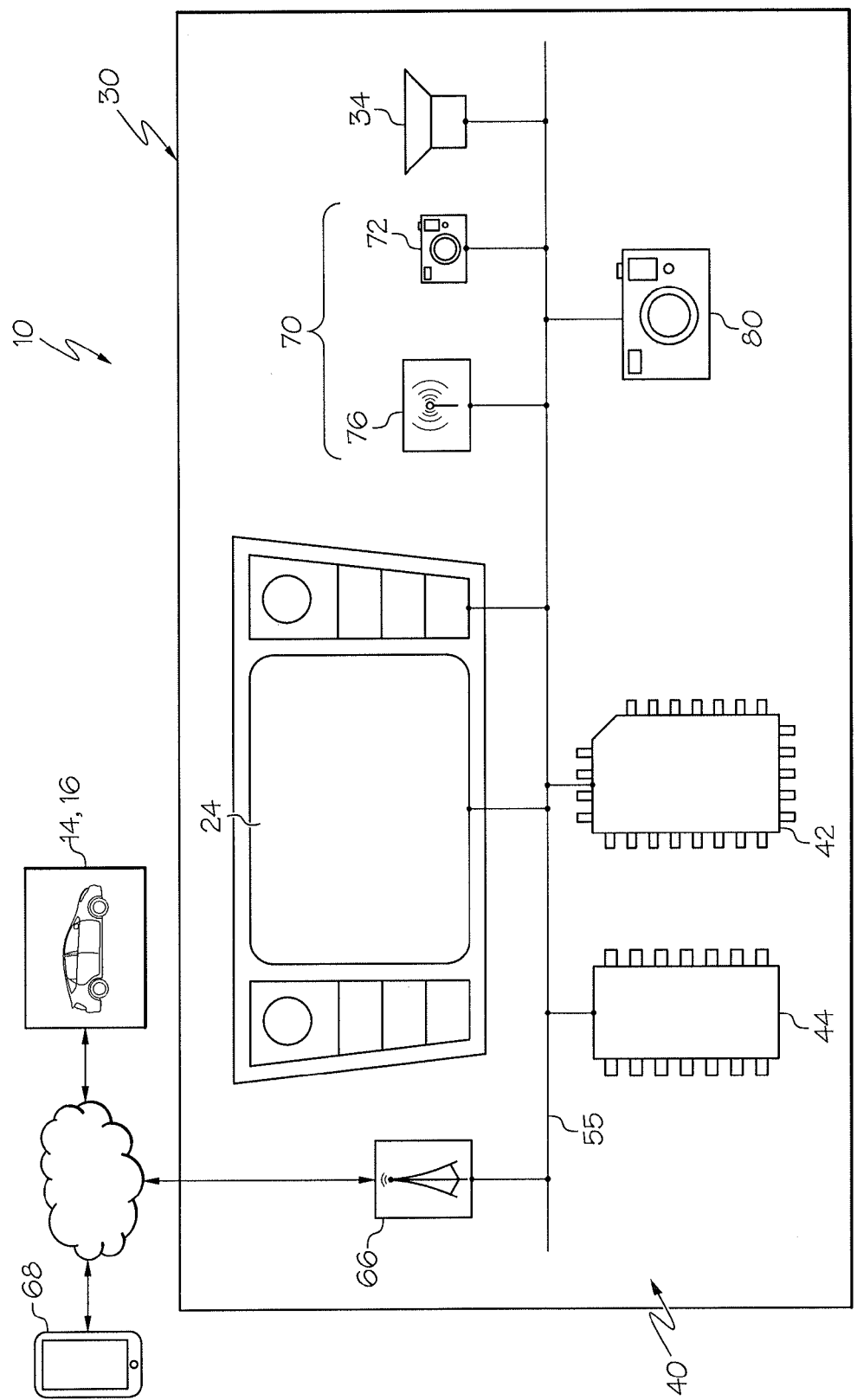
FIG. 3 is a schematic illustration of a system for the autonomous vehicle of FIG. 1 including an object detection and notification system according to one or more embodiments shown and described herein.

Referring to FIG. 3, the autonomous vehicle 10 includes the object detection and notification system 30 that utilizes one or more computing devices 40. The computing devices 40 can be any type of vehicle-installed (ECU), handheld, desktop, or other form of computing device, or can be composed of multiple computing devices. One or more processors 42 in the computing device 40 can be a single device, or multiple devices, capable of manipulating or processing information. Memory 44 in the computing device 40 can be a random access memory device (RAM) or any other suitable type of storage device. The memory 44 can include data that is accessed by the one or more processors 42 using a communication path 55. The memory 44 can also include an operating system and installed applications, the installed applications including programs that permit the one or more processors 42 to perform various target object detection methods.

The one or more processors 42 may be any device capable of executing machine readable instructions. The one or more processors 42 may be coupled to the communication path 55 that provides signal interconnectivity between various modules. Accordingly, the communication path 55 may communicatively couple any number of processors with one another, and allow the modules coupled to the communication path 55 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

The communication path 55 may be formed from any medium that is capable of transmitting a signal such as, for example, conductive wires, conductive traces, optical waveguides, or the like. In some embodiments, the communication path 55 may facilitate the transmission of wireless signals, such as WiFi, Bluetooth, and the like. Moreover, the communication path 55 may be formed from a combination of mediums capable of transmitting signals. In one embodiment, the communication path 55 comprises a combination of conductive traces, conductive wires, connectors, and buses that cooperate to permit the transmission of electrical data signals to components such as processors, memories, sensors, input devices, output devices, and communication devices. Accordingly, the communication path 55 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The object detection and notification system 30 further includes one or more memory modules 44 coupled to the communication path 55. The one or more memory modules 44 may comprise RAM, ROM, flash memories, hard drives, or any device capable of storing machine readable instructions such that the machine readable instructions can be accessed by the one or more processors 42. The machine readable instructions may comprise logic or algorithm(s) written in any programming language of any generation (e.g., 1GL, 2GL, 3GL, 4GL, or 5GL) such as, for example, machine language that may be directly executed by the one or more processors 42, or assembly language, object-oriented programming (OOP), scripting languages, microcode, etc., that may be compiled or assembled into machine readable instructions and stored on the one or more memory modules 44. The machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 44 may include a database that includes navigation information and/or map information. However, it should be understood that other embodiments may not include navigation information and/or map information. In such embodiments, the object detection and notification system 30 may display on the display 24 road parameters. As an example, and not a limitation, road parameters may include lane lines, on/off ramps, barriers and other structures. Furthermore, the one or more memory modules 44 may include an image recognition database and algorithm to allow the object detection and notification system 30 to identify a target object type sensed within a vicinity of the autonomous vehicle 10.

The autonomous vehicle 10 comprises the display 24 for providing visual output such as, for example, maps, navigation, entertainment, information, or a combination thereof. The display 24 may coupled to the communication path 55, as shown in FIG. 3. Accordingly, the communication path 55 can communicatively couple the display 24 to other modules of the autonomous vehicle 10. The display 24 may include any medium capable of transmitting an optical output such as, for example, a cathode ray tube, light emitting diodes, a liquid crystal display, a plasma display, or the like. Moreover, the display 24 may be a touch screen that, in addition to providing optical information, detects the presence and location of a tactile input upon a surface of or adjacent to the display 24. Accordingly, the display 24 may receive mechanical input directly upon the optical output provided by the display 24. Additionally, it is noted that the display 24 can include at least one of the one or more processors 42 and the one or memory modules 44. As noted above, the display 24 could be at least one of a heads-up display, an instrument cluster display, and a mobile device display. In some embodiments, the autonomous vehicle 10 may have a plurality of displays. In such embodiments, the autonomous vehicle 10 could also have a plurality of different types of displays. For example, and not as a limitation, the autonomous vehicle 10 could have an in-dashboard display and a heads-up display for displaying information directly on a windshield or other window of the autonomous vehicle 10.

In some embodiments, the autonomous vehicle 10 comprises network interface hardware 66 for communicatively coupling the autonomous vehicle 10 to a target object 14 such that data can be sent between the autonomous vehicle 10 and target object 14. For instance, the autonomous vehicle 10 and target object 14 may send and receive information relevant to speed, road conditions, oncoming obstacles, etc. In some embodiments, wherein the target object 14 is a vehicle, this may be referred to as vehicle-to-vehicle communication. The network interface hardware 66 can be communicatively coupled to the communication path 55 and can be any device capable of transmitting and/or receiving data via a network. Accordingly, the network interface hardware 66 can include a communication transceiver for sending and/or receiving any wired or wireless communication. For example, the network interface hardware 66 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 66 includes hardware configured to operate in accordance with the Bluetooth wireless communication protocol. In another embodiment, network interface hardware 66 may include a Bluetooth send/receive module for sending and receiving Bluetooth communications to/from a mobile device 68. Some embodiments may not include the network interface hardware 66.

The object detection and notification system 30 may include one or more sensors 70 communicatively coupled to the one or more processors 42. The one or more sensors 70 may be used in conjunction with vehicle-to-vehicle communication or alone. The one or more sensors 70 can include, but are not limited to, cameras, LiDAR, RADAR, and proximity sensors. In some embodiments, multiple types of sensors 70 can be used to provide a variety of information to the object detection and notification system 30.

For instance, FIG. 3 illustrates the autonomous vehicle 10 utilizing a variety of sensors 70. A camera 72 may be coupled to the communication path 55 such that the communication path 55 communicatively couples the camera 72 to other modules of the autonomous vehicle 10. The camera 72 may be any device having an array of sensing devices capable of detecting radiation in an ultraviolet wavelength band, a visible light wavelength band, or an infrared wavelength band. The camera 72 may have any resolution. Suitable cameras may include, for example, a video camera, charge coupled device (CCD) camera, complementary metal-oxide-semiconductor (CMOS) camera, etc. Some embodiments may not include the camera 72. Some embodiments may include multiple cameras. In operation, the camera 72 may be able to detect a target object 14, 16 within a vicinity of the autonomous vehicle 10. Further, the camera 72 may be able to determine one or more characteristics about the target object 14, 16, such as, for example, the speed and direction of travel of the target object 14, 16. In further embodiments, the camera 72 and/or the one or more processors 42, based on input from the camera 72, may be able to also determine the type of object the camera 72 is capturing through image recognition capabilities. For example, the camera 72 and/or the one or more processors 42 may be able to determine whether the target object 14, 16 is another vehicle, a cyclist, a pedestrian, an animal, and/or a structure.

Still referring to FIG. 3, the autonomous vehicle 10 may further include other sensors represented by a second sensor 76 in addition to the camera 72. The second sensor 76 is coupled to the communication path 55 such that the communication path 55 communicatively couples the second sensor 76 to other modules of the autonomous vehicle 10. The second sensor 76 may be any device capable of outputting a signal indicative of the speed, direction of travel, and the general proximity of the target object 14, 16 to the autonomous vehicle 10. In some embodiments, the second sensor 122 may include RADAR, LiDAR, or the like. As described above, any sensor or combinations of sensors may be used to detect and monitor a target object 14, 16.

The autonomous vehicle 10 further includes the sound notification system 32 that includes the one or more speakers 34 coupled to the communication path 55 such that the communication path 55 communicatively couples the speaker 34 to other modules of the autonomous vehicle 10. The speaker 34 transforms data signals received by the one or more processors 42 (of a sound control unit) into audible mechanical vibrations that can be perceived by the vehicle occupant as being located at a particular spatial position and, in some embodiments, moving through space to one or more different locations (e.g., though binaural and/or surround sound). The sound notification system 32 including the speaker 34 is configured to provide information to an occupant of the autonomous vehicle 10 about the target object 14, 16 indicative of behavior of the target object 14, 16 relative to the autonomous vehicle 10, which will be described in greater detail below.

The object detection and notification system 30 may further include an occupant monitor device 80 to detect information related to and indicative of the occupant's viewing angle. In some embodiments, the occupant monitor device 80 may be an in-vehicle camera, as described above in reference to camera 72. In some embodiments, the occupant monitor device 80 may be incorporated into a wearable device, such as glasses, as part of a helmet, etc. In some embodiments, the occupant monitor device 80 can provide information regarding the orientation of the occupant's eyes, or other information related to viewing angle of occupant. The occupant monitor device 80 can be a camera on a portable device such as a tablet or cellular phone that is configured to acquire information related to the viewing angle of the occupant. Image processing circuitry can be provided by the occupant monitor device 80 or can be external to the occupant monitor device 80, e.g., provided by processors 42.

The images and information of the occupant monitor device 80 can be processed and stored on the occupant monitor device 80, or the images can be stored and processed by the processors 42. The images and information can also be stored on the memory modules 44 and processed later in order to detect changes in the viewing angle. The various processing described herein can be performed locally or in combination with external processing by, e.g., remote processing circuitry.

The one or more processors 42 may implement a method of monitoring and providing sound cues to localize the occupant's awareness to the target object 14, 16 outside of the autonomous vehicle 10 in a spatio-temporal fashion. In some embodiments, the method may be implemented as logic within the machine readable instructions stored in the one or more memory modules 44, that, when executed by the one or more processors 42, automatically provides autonomous vehicle 10 function instruction. It is noted that, while the method may be described as following a specific sequence, additional embodiments of the present disclosure are not limited to any particular sequence.

In operation, the one or more processors 42, through the one or more sensors 70, detect the presence of a target object 14, 16 within a vicinity of the autonomous vehicle 10. The vicinity of the autonomous vehicle 10 refers generally to a space surrounding the autonomous vehicle 10, which can be a predetermined range. As such, the vicinity of the autonomous vehicle 10 may include at least up to a reliable sensing range of the one or more sensors 70. In some embodiments, the autonomous vehicle 10 may only monitor target objects 14, 16 preceding and/or following the autonomous vehicle 10 and/or within a predetermined range.

The autonomous vehicle 10 may detect the target object 14, 16 within the vicinity of the autonomous vehicle 10 in a variety of ways. For instance, the one or more processors 42 may determine the presence of the target object 14, 16 within the vicinity of the autonomous vehicle 10 using the one or more sensors 70 as described herein. As such, the one or more processors 42 may detect the target object 14, 16 by at least the following non-limiting examples: vehicle-to-vehicle communication, cameras, LiDAR, RADAR, and proximity sensors. Once the one or more processors 42 has detected the target object 14, 16 within the vicinity of the autonomous vehicle 10, the one or more processors 42 monitor the position, speed, and direction of travel of the target object 14, 16 with the one or more sensors 70.

As indicated above, the object detection and notification system 30 utilizes patterned sound cues to localize the occupant's awareness to a particular spatial location associated with a detected direction of warning. The patterned sound cues can be for example, patterns saved in the memory module 44 that can be chosen by the one or more processors 42 based on input from the sensors 70 and/or produced in real-time (e.g., using a real-time binaural/3D sound engine). A warning condition may be determined by the one or more processors 42 based on input from the sensors 70 and one or more of (i) detected direction of the target object, (ii) detected distance to the target object and (iii) relative/closing speed of the target object. Target classification may also be used where a warning pattern is provided depending on target object type, such as heavy truck, pedestrian, etc. When a warning condition is identified, audible feedback can be provided by the object detection and notification system 30 to indicate the warning condition is present and can provide information regarding any one or more of its direction, distance and closing speed intensity.

Figure 4A:
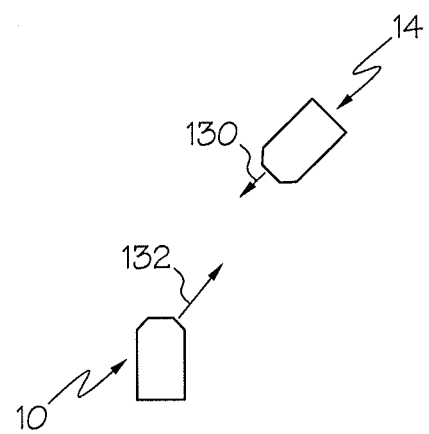
FIG. 4A diagrammatically illustrates a process of providing information to an occupant of the autonomous vehicle of FIG. 1 about a target object using sound according to one or more embodiments shown and described herein.
Figure 4B:
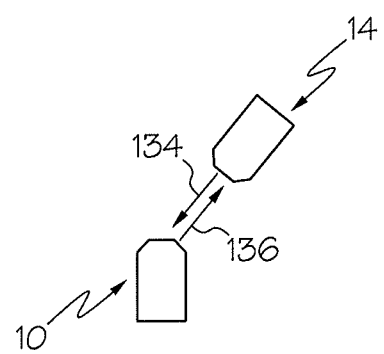
FIG. 4B diagrammatically illustrates another process of providing information to an occupant of the autonomous vehicle of FIG. 1 about a target object using sound according to one or more embodiments shown and described herein.
Figure 5:
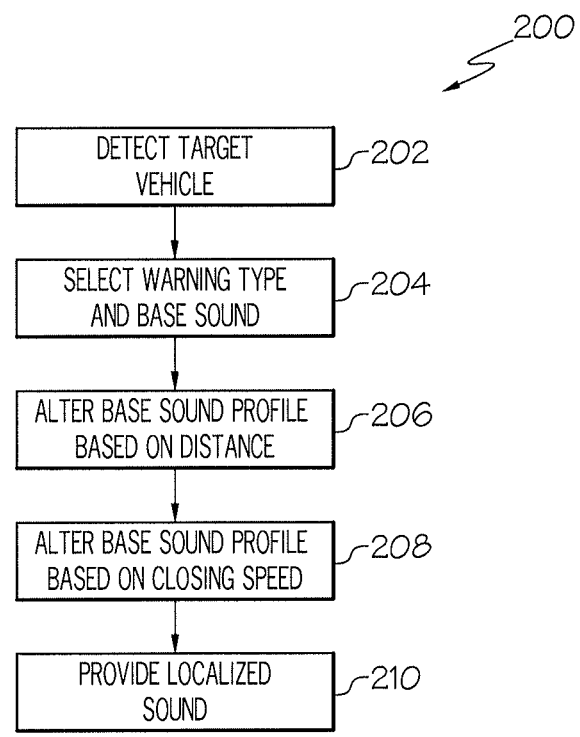
FIG. 5 illustrates a method of providing information to an occupant of the autonomous vehicle of FIG. 1 about a target object using sound according to one or more embodiments shown and described herein.

Referring to FIGS. 4A and 4B, the autonomous vehicle 10 is illustrated approaching a target vehicle 14. FIG. 5 illustrates an exemplary method 200 of providing information to the vehicle occupant. In FIG. 4A, the relative distance between the autonomous vehicle 10 and the target vehicle 14 decreases at a relatively slow rate (which is represented by arrow 130). The object detection and notification system 30 may detect the presence of the target vehicle 14 using, for example, any one or more of the sensors 70 (FIG. 3) at step 202. The object detection and notification system 30 may also acquire information indicative of direction of travel, speed (relative and/or actual speed) and proximity of the target vehicle 14. Vehicle-to-vehicle communication may also or alternatively be used, as discussed above. Vehicle-to-vehicle communication may be useful in determining, for example, an intended path of the target vehicle 14.

A warning type and base sound profile may be selected at step 204. The profile intensity may be altered from the base sound profile to match the distance to the target vehicle 14 at step 206. Likewise, the Doppler shift frequency may be changed from the base sound profile based on closing speed of the target vehicle 14 at step 208. In the illustrative example of FIG. 4A, the object detection and notification system 30 may make a minor threat determination based on the various conditions described above. In this instance, the sound notification system 32 (FIG. 3) may then provide a sound that is perceived by the occupant as coming from the direction of the target vehicle 14 (i.e., the threat direction) as represented by arrow 132 at step 210. Loudness (intensity) and Doppler shift (or other perceived frequency modification), if any, may be selected by the object detection and notification system 30 that is indicative of the minor threat determination. For example, an aural intensity cue such as loudness can be used to convey distance to the target vehicle 14. The closing speed of the target vehicle 14 can be communicated by Doppler shifting the sound pattern in accordance with the closing speed. In the example of FIG. 4A, the Doppler shifting may be small due to the lower relative velocity of the two vehicles.

In the example of FIG. 4B, the object detection and notification system 30 may make a higher threat determination based on the relatively high rate that the relative distance between the autonomous vehicle 10 and the target vehicle 14 decreases (which is represented by arrow 134) and the various conditions described above. In this instance, the sound notification system 32 (FIG. 3) may then provide a sound that is perceived by the occupant as coming from the direction of the target vehicle 14 as represented by arrow 136. Loudness and Doppler shift (or other perceived frequency modification), if any, may be selected by the object detection and notification system 30 that is indicative of the higher threat determination. For example, a louder sound and greater Doppler shift may be provided perceived as originating from the threat direction.

Figure 6:
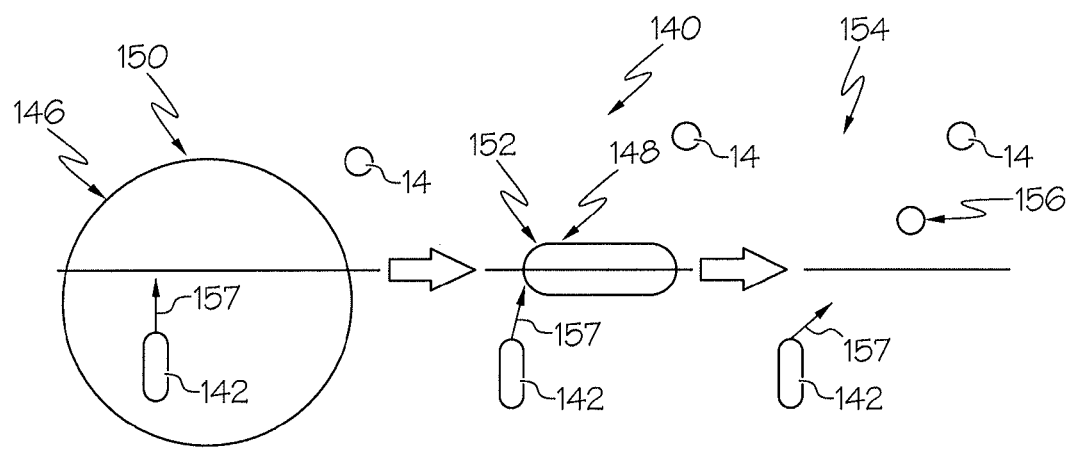
FIG. 6 diagrammatically illustrates another process of providing information to an occupant of the autonomous vehicle of FIG. 1 about a target object using sound according to one or more embodiments shown and described herein.

Referring to FIG. 6, another method 140 of providing information to an occupant (represented by element 142) of the autonomous vehicle 10 about the target vehicle 14 can use sound to lead the occupant's viewing angle toward a threat direction of the target vehicle 14. In this embodiment, the current viewing angle (represented by arrow 157) may be unknown by the object detection and notification system 30. However, in some embodiments, the method 140 may be utilized with the current viewing angle known by the object detection and notification system 30. Similar to above, the object detection and notification system 30 may detect presence of a target vehicle 14 using, for example, any one or more of the sensors 70. The object detection and notification system 30 may also acquire information indicative of direction of travel, speed (relative and/or actual speed) and proximity of the target vehicle 14. Once a threat condition is determined, an initial sound (represented by area 146) may be provided by the sound notification system 32, in step 150. The initial sound provided by the sound notification system 32 may have a relatively low localization quality. Such low localization quality can be achieved, for example, through the use of perceived sounds over a range of the occupant's head or sound provided by multiple speakers at different locations and/or the use of relatively low frequency (e.g., less than about 500 Hz) sound, which is not as highly attenuated by the occupant compared to relatively high frequency (e.g., greater than 500 Hz) sound. This initial sound having low localization quality is represented by the relatively large area of 146.

Once the initial sound is provided by the sound notification system 32 for a period of time, the initial sound can be changed to increasingly localize the sound, which is represented by smaller area 148 in step 152. The terms "increasingly localize" or "continued localization" refer to an increased use of sound localization techniques (e.g., surround sound, speaker utilization, interaural time and level differences, head-related transfer function) to achieve the occupant's perception of sound coming from a particular location in space. A head-related transfer function (HRTF), for example, is a response that characterizes how an ear receives a sound from a point in space. A pair of HRTFs for two ears can be used to synthesize a binaural sound that seems to come from a particular point in space. At step 154, continued localization of the sound (represented by element 156) can lead the viewing angle of the occupant 142 toward the target vehicle 14. The steps of continued localization of the sound can take place as a relatively continuous localization (e.g., along a continuous path) or in steps (e.g., as jumps). As above, loudness and Doppler shift (or other perceived frequency modification), if any, may be selected by the object detection and notification system 30 that is indicative of a higher or lower threat determination.

Figure 7:
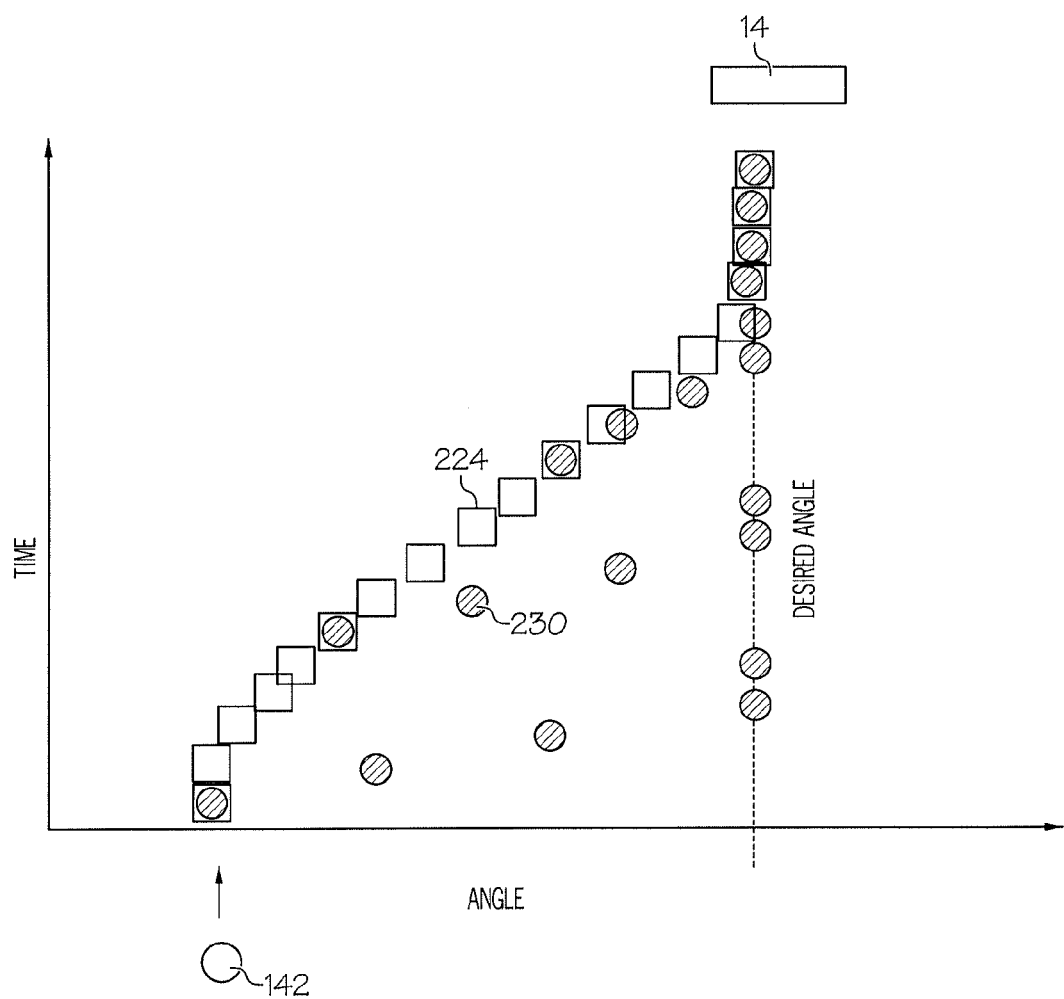
FIG. 7 diagrammatically illustrates another process of providing information to an occupant of the autonomous vehicle of FIG. 1 about a target object using sound according to one or more embodiments shown and described herein.
Figure 8:
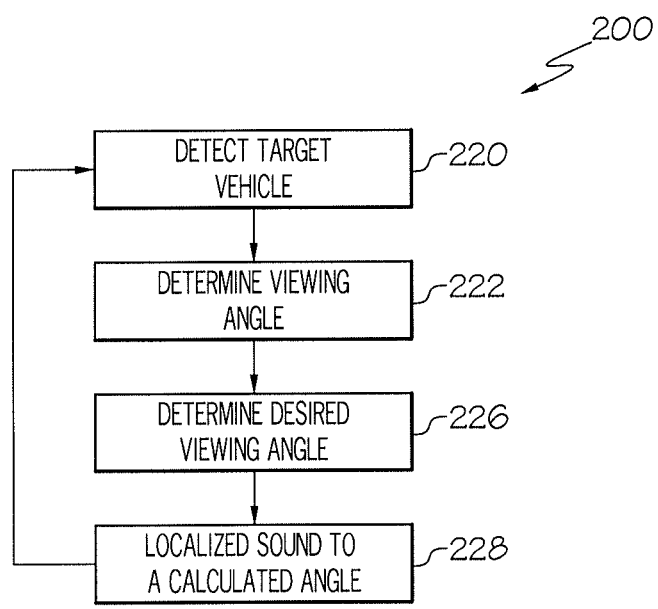
FIG. 8 illustrates a method of providing information to an occupant of the autonomous vehicle of FIG. 1 about a target object using sound according to one or more embodiments shown and described herein.

Referring to FIGS. 7 and 8, in some embodiments, determination of an occupant 142 viewing angle can be used by the object detection and notification system 30. Similar to described above, the object detection and notification system 30 may detect presence of a target vehicle 14 using, for example, any one or more of the sensors 70 at step 220. The object detection and notification system 30 may also acquire information indicative of direction of travel, speed (relative and/or actual speed) and proximity of the target vehicle 14. Once a threat is detected, the object detection and notification system 30 can determine viewing angle at step 222 (represented by empty squares 224). The object detection and notification system 30 may then determine a desired viewing angle at step 226. At step 228, logic may be provided such that the object detection and notification system 30 localizes sound to a calculated angle (represented by areas 230) based, at least in part, on the current viewing angle of the vehicle occupant and the desired viewing angle of the occupant and moves (e.g., continuously and/or intermittently) toward the desired viewing angle in stages. As represented by FIG. 7, the process may repeat until the occupant's viewing angle matches the desired viewing angle.

The systems and methods using the object detection and notification system 30 of FIGS. 4-8 may be used separately or together. For example, a particular method of providing information to an occupant of the autonomous vehicle 10 about the target vehicle 14 can be chosen based on threat level and/or based on detected viewing angle of the occupant. Other sensors can also be used to monitor the driver's response (e.g., brake sensors and a "hands on the wheel" grip sensor included in the steering wheel to monitor whether the driver's hands are properly grasping the steering wheel), where these other sensors provide additional information about the driver's response. A grip sensor can include one or more tactile, pressure, or capacitive sensors, where output signals therefrom can be utilized to determine how the driver's hands are grasping the steering wheel. A database can store positions of proper or acceptable hand placements on the steering wheel, and detected positions or contact pressures can be compared with the stored positions to determine whether the driver's hands are properly grasping the steering wheel. The detection of hands on the wheel can be used to determine whether the driver is responsive to an audible warning. Also, the lack of detecting the hands on the wheel or an improper positioning can trigger an audible warning. An optical sensor, such as a camera, can also detect hand position, either collaboratively with the grip sensor or alone.

If changes related to the driver indicate that the driver is in the process of responding appropriately to the audible warning, then the threat condition level can be maintained at its current level or can be maintained at an attenuated level where appropriate. If, however, there are not indications that the driver is in the process of responding appropriately, then the threat condition level can escalate increasing the urgency of the warning and making the threat condition output more captivating by changing the intensity, quality, pattern, volume. These changes and other augmentations to a threat condition can be applied to, e.g., a vibration, sound, light, or other forms of energy output that are emitted as the warning output. The process can be an iterative loop, whereby after changing the threat condition level, the process continues to monitor the driver's response and correspondingly adjusts the threat condition until either the driver has fully responded to the threat condition and/or the hazard is no longer present. The method can end after completing the adjust threat condition process.

It should be understood that embodiments described herein provide autonomous vehicles and methods for displaying a behavior of a target object in a spatio-temporal manner using localized sound. As such, embodiments described herein allow a user of a vehicle an additional dimension for monitoring the motion of objects outside of the autonomous vehicle. This is particularly useful for drivers of autonomous vehicles who may only be checking in periodically with road conditions and, as such, need to be able to quickly and efficiently understand the motions of objects outside of their vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An object detection and notification system of an autonomous vehicle, comprising:
   an object detection system that detects a presence of a target object within a sensing range of one or more sensors of the object detection system and determines a direction of travel of the target object relative to the autonomous vehicle based on the detection of the presence of the target object from the one or more sensors;
   a notification system that provides a sound cue using a speaker to an occupant of the autonomous vehicle that is indicative of a location of the target object relative to the autonomous vehicle based on the detection of the presence of the target object from the one or more sensors; and
   an occupant monitoring device that provides information indicative of a viewing angle of the occupant that is used by the object detection and notification system to provide the sound cue;
   wherein the notification system localizes the sound cue to a calculated angle based on the viewing angle of the occupant and moves a perceived location of the localized sound cue in a spatio-temporal fashion in stages increasingly toward a desired viewing angle based on the direction of travel of the target object.

2. The object detection and notification system of claim 1, wherein the object detection system determines a distance of the target object relative to the autonomous vehicle based on the detection of the presence of the target object from the sensor.

3. The object detection and notification system of claim 2, wherein the notification system changes a frequency of the sound cue based on the distance of the target object relative to the autonomous vehicle.

4. The object detection and notification system of claim 2, wherein the notification system changes an intensity of the sound cue based on the distance of the target object relative to the autonomous vehicle.

5. An autonomous vehicle comprising:
   one or more processors;
   one or more non-transitory memory modules communicatively coupled to the one or more processors;
   a speaker connected to the one or more processors;
   an object detection system comprising one or more sensors, communicatively coupled to the one or more processors, that detects a presence of a target object within a sensing range of the one or more sensors and determines a direction of travel of the target object relative to the autonomous vehicle based on the detection of the presence of the target object from the one or more sensors;
   machine readable instructions stored in the one or more non-transitory memory modules that cause the one or more processors to provide a sound cue using the speaker to an occupant of the autonomous vehicle that is indicative of a location of a target object relative to the autonomous vehicle based on the detection of the presence of the target object from the one or more sensors; and
   an occupant monitoring device that provides information indicative of a viewing angle of the occupant that is used by the one or more processors to provide the sound cue;
   wherein the one or more processors localize the sound cue to a calculated angle based on the viewing angle of the occupant and moves a perceived location the localized sound cue in a spatio-temporal fashion in stages increasingly toward a desired viewing angle based on the direction of travel of the target object.

6. The autonomous vehicle of claim 5 comprising machine readable instructions stored in the one or more non-transitory memory modules that cause the one or more processors to determine a distance of the target object relative to the autonomous vehicle based on the detection of the presence of the target object from the one or more sensors.

7. The autonomous vehicle of claim 6 comprising machine readable instructions stored in the one or more non-transitory memory modules that cause the one or more processors to change a frequency of the sound cue based on the distance of the target object relative to the autonomous vehicle.

8. The autonomous vehicle of claim 6 comprising machine readable instructions stored in the one or more non-transitory memory modules that cause the one or more processors to change an intensity of the sound cue based on the distance of the target object relative to the autonomous vehicle.

9. A method of providing information to an occupant of an autonomous vehicle about a target object, the method comprising:
   detecting, by an object detection system of the autonomous vehicle, a presence of the target object within a sensing range of one or more sensors of the object detection system that provide input to one or more processors of the autonomous vehicle;
   determining, by the one or more processors, a direction of travel of the target object relative to the autonomous vehicle using the input;
   providing, by the one or more processors, a sound cue using a speaker to the occupant of the autonomous vehicle that is indicative of a location of the target object relative to the autonomous vehicle; and
   providing information indicative of a viewing angle of the occupant using an occupant monitoring device that is used by the one or more processors to provide the sound cue;
   wherein the one or more processors localize the sound cue to a calculated angle based on the viewing angle of the occupant and moves a perceived location of the localized sound cue in a spatio-temporal fashion in stages increasingly toward a desired viewing angle based on the direction of travel of the target object.

10. The method of claim 9 further comprising
    determining, by the one or more processors, a distance of the target object relative to the autonomous vehicle using the input; and
    the one or more processors changing one or both of a frequency and intensity of the sound cue based on the distance of the target object relative to the autonomous vehicle.

* * * * *